United States Patent [19]
Johansson

[11] Patent Number: 5,327,470
[45] Date of Patent: Jul. 5, 1994

[54] SPACER WITH STEAM SEPARATOR

[75] Inventor: Eric B. Johansson, Wrightsville Beach, N.C.

[73] Assignee: General Electric Company, San Jose, Calif.

[21] Appl. No.: 832,835

[22] Filed: Feb. 7, 1992

[51] Int. Cl.$^5$ ............................................. G21C 3/34
[52] U.S. Cl. ................................... 376/438; 376/448
[58] Field of Search .............. 376/438, 448, 434, 442, 376/439; 976/DIG. 81

[56] References Cited

U.S. PATENT DOCUMENTS

| | | | |
|---|---|---|---|
| Re. 28,362 | 3/1975 | Calvin | 376/439 |
| 3,625,822 | 12/1971 | Mantle | 376/439 |
| 3,629,066 | 12/1971 | Andersson | 376/436 |
| 3,764,470 | 10/1973 | Calvin | 376/439 |
| 4,725,403 | 2/1988 | Buettiker | 316/439 |
| 4,775,510 | 10/1988 | Bryan | 376/443 |
| 4,913,875 | 4/1990 | Johansson et al. | 376/439 |
| 5,032,351 | 7/1991 | Johansson | 376/438 |
| 5,112,571 | 5/1992 | Orii et al. | 376/439 |

FOREIGN PATENT DOCUMENTS

| | | |
|---|---|---|
| 0456055A1 | 11/1991 | European Pat. Off. |
| 4013397A1 | 10/1990 | Fed. Rep. of Germany |
| 1014822 | 12/1965 | United Kingdom |
| 1016113 | 1/1966 | United Kingdom |

Primary Examiner—Donald P. Walsh
Assistant Examiner—Meena Chelliah
Attorney, Agent, or Firm—J. S. Beulick

[57] ABSTRACT

A cross point spacer is provided with subchannel vertical tubes at the subchannel volumes, these tubes being supplied with an inner flow free cylindrical volume and an peripheral steam separator in the form of a surface which imparts a spiral flow pattern to steam/water mixture flowing peripherally upwardly within the subchannel tube. According to a first and preferred embodiment, the subchannel tube of the cross point spacer is provided with rifling. According to a second embodiment, twisted vanes are installed and fastened to the interior of the subchannel tube and drilled away at the central portion of the twisted vanes to leave strips of metal defining rifling like paths on the subchannel tube interior. In either case, the main and central portion of the subchannel volume through the spacer is provided with an unobstructed central portion for upward steam flow. At the same time, the peripheral portion of the subchannel tube imparts a steam separator centrifugal upward spiral flow to water particles within the subchannel tube. Upon exit of the water and generated steam from the vertically disposed subchannel tube, a separated steam flow overlying the subchannel tube occurs. At the same time, entrained water is centrifugally classified outwardly from the steam flow to the surrounding steam generating fuel rods for the generation of steam.

10 Claims, 8 Drawing Sheets

SPACER WITH STEAM SEPARATOR

This invention relates to a spacer in a boiling water nuclear reactor fuel bundle for maintaining the fuel rods within the fuel bundle in their designed spaced apart relation. More particularly, a spacer of the so-called "cross point" variety is illustrated where tubes placed in the subchannel space of the cross point have steam separators incorporated in their interior.

BACKGROUND OF THE INVENTION

Fuel bundles in boiling water nuclear reactors require spacers for the maintenance of their fuel rods in designed spaced apart relation. Such fuel bundles have an array of upstanding side-by-side fuel rods supported at the bottom on a lower tie plate. At least some of the fuel rods extend to an upper tie plate. All fuel rods are surrounded between the tie plates by a fuel bundle channel. The lower tie plate is configured to permit the inflow of moderating water coolant while the upper tie plate permits the outflow of both water coolant and generated steam. The surrounding channel confines the flow of coolant to a path around the steam generating fuel rods separate from a water flooded core bypass region surrounding each fuel bundle.

The generation of steam within a boiling water reactor fuel bundle can be simply understood. At the bottom of the fuel bundle, liquid coolant is pumped into, enters and rises upwardly within the channel and around the fuel rods. As the coolant proceeds upwardly, steam is generated in an increasing fraction within the upward coolant flow. As a result, the upper portion of the fuel bundle is typically referred to as the "two phase" region of the fuel bundle, these two phases being water and steam. An increasing amount of steam or "void fraction" is generated as the coolant rises and passes out of the fuel bundle through the upper tie plate.

The flow in the upper two phase region of the fuel bundle is characterized by differential flow rates between the upwardly flowing water and the upwardly flowing steam. The upwardly flowing water tends to adhere to and cover all available surfaces. This upward flow of water usually occurs at a relatively low velocity when compared to the upward flow rate of the generated steam. The upwardly flowing steam tends to move to all open spaces within the fuel bundle and away from all surfaces. This upward flow of steam occurs at a relatively high velocity when compared to the upward flow rate of the water.

It is common to compare the upward flow rate of steam in a fuel bundle geometry to the upward flow rate of water in a ratio known as the "slip ratio." This slip ratio always constitutes a number greater than one and usually falls with the range of 2 to 20.

In a regular row and column array of fuel rods, the greatest volume of upward steam flow occurs in the so-called "subchannel" volume. This region constitutes a roughly cylindrical volume between four adjacent fuel rods. The steam-water mixture in the subchannel is mostly steam flowing upwardly at a relatively high velocity while the surrounding volumes adjacent to the fuel rods have a higher concentration of slower moving water.

The fuel rods extending between the tie plates are long slender fuel pellet filled sealed tubes. Absent any restraint during the fluid flow and steam generating process, these fuel rods would vibrate from their original designed spacing and most likely come into abrading contact. To prevent this abrading contact as well as to maintain the fuel rods in their original design spacing for nuclear efficiency, it is the regular practice of the nuclear industry to place fuel rod spacers interior of the fuel bundles.

Typically such fuel rod spacers individually surround and hold each fuel rod at the particular elevation of the spacer. These spacers are placed at sufficient selected vertical intervals to minimize fuel rod vibrations and to prevent abrading contact and maintain designed fuel rod spacing.

Fuel bundle spacers of various varieties have been developed. Such spacers include cell type spacers made of spring steel (commonly Inconel) in which a small matrix of spring steel surrounds each of the fuel rods, ferrule spacers in which each fuel rod is surrounded by its own individual ferrule, and egg crate spacers in which a generally square grid defines discrete cells surrounding each fuel rod.

When the generation of steam within a fuel bundle is considered, egg crate spacers have an inherent disadvantage. The points of connection of the grid are in the subchannel volumes between the fuel rods. This intersection of the grid is in the middle of the high velocity upward flowing steam. With this intersection, upward steam flow is inhibited.

This problem has been recognized in the prior art. Specifically, in prior art spacer construction it has been suggested to eliminate the grid intersections and substitute vertically upstanding subchannel tubes at the intersections of the grid. This spacer type has been called a "cross-point" spacer. The present invention is directed to spacers of the cross point type. Instead of having the grid secured by an intersection interfering with high velocity steam flow in the subchannel volume, the grid is secured by the outside of the subchannel tube. Thus, the exterior of the subchannel tube provides the necessary grid interconnection. Further, the interior of the subchannel tube provides the necessary subchannel volume for upward steam flow. This has the advantage of taking the intersection of the grid out of the subchannel volume and providing the cylindrical volume required for the subchannel flow interior of the tube for the upward steam flow.

SUMMARY OF THE INVENTION

A cross point spacer contains vertical tubes at the subchannel locations. These tubes permit free passage of the high velocity steam-water mixture flowing through the subchannels.

The present invention modifies these tubes to impart a swirl component to the flow through tubes, while minimizing the increase in pressure drop. According to first and preferred embodiment, the tube is made thicker and is provided with rifling.

According to a second embodiment, twisted vanes are installed and welded to the interior of the subchannel tube and the central portion of the twisted vanes are drilled away to leave strips of metal defining rifling like paths on the subchannel tube interior. In either case, the main and central portion of the subchannel volume through the spacer is provided with an unobstructed central portion for upward steam flow. At the same time, the peripheral portion of the subchannel tube imparts an upward spiral flow to water particles within the subchannel tube, similar to the action of a steam separator. Upon exit of the water and generated steam from the vertically disposed subchannel tube, a separated steam flow overlying the subchannel tube occurs. At the same time, entrained water is centrifugally classified outwardly from the steam flow to the surrounding steam generating fuel rods for the generation of steam.

A serendipitous result of allowing the fuel bundle to maintain more moderator follows from the installation of the steam separators at the subchannel tubes. As is well known in the boiling water nuclear industry, it is desirable to have a high water fraction present within a fuel bundle. Water is necessary to moderate high speed neutrons emitted by the nuclear reaction to slow speed or "thermal" neutrons necessary to continue the nuclear reaction. Where increasing amounts of vapor are present within a fuel bundle to present a so-called high "void fraction", moderation of fast neutrons is not as efficient.

With the subchannel tubes of this invention and their steam separating interiors, steam flow volumes having lesser fractions of water entrained in the steam flow are provided after exit from the cross point tubes. A high slip ratio of steam velocity relative to water velocity is achieved. These upwardly flowing volumes of concentrated steam enable the spacer equipped fuel bundle to accommodate the necessary upward steam flow at a higher velocity in a smaller total fraction of the fuel bundle volume. As a smaller total volume of the fuel bundle is required for the upward steam flow, the remainder of the fuel bundle can be occupied with coolant having a high liquid fraction. Consequently, the fuel bundle accommodates more liquid moderator to promote a more efficient nuclear reaction.

DESCRIPTION OF THE PREFERRED EMBODIMENT

Figure 10:
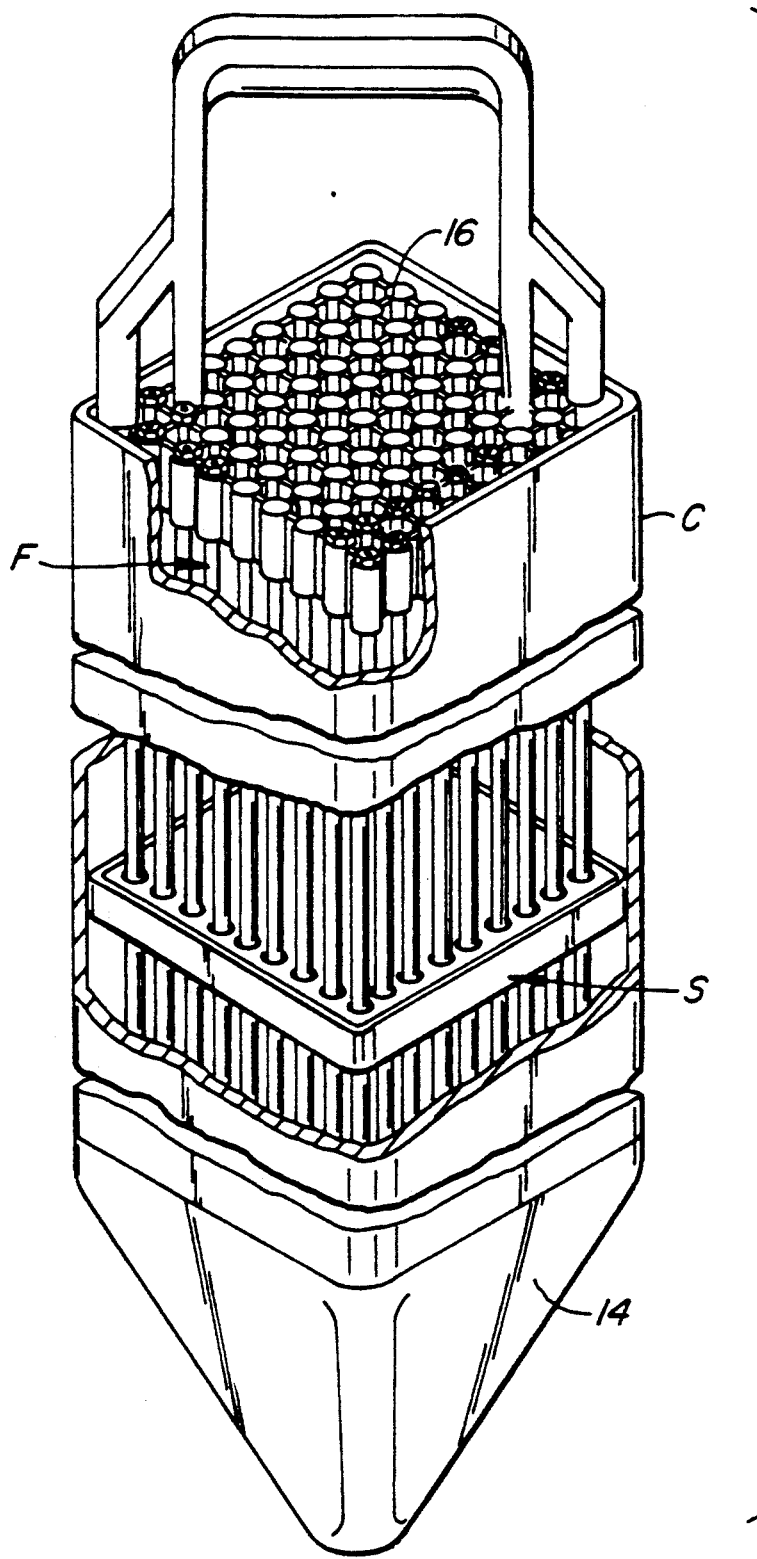

Referring to FIG. 10, a typical fuel bundle is illustrated. An upper tie plate 16, lower tie plate and inlet orifice 14 with a plurality of fuel rods F extending therebetween is shown. Only one spacer S is shown between the tie plates. The reader will realize that the vast length of the fuel bundle is not shown; typically fuel bundles are in the order of 160 inches long with a 5.25 inch by 5.25 inch cross section and containing between 5 and 9 spacers, with 7 spacers distributed at equal vertical intervals along the length of the fuel bundle being the usual arrangement.

Figure 1:
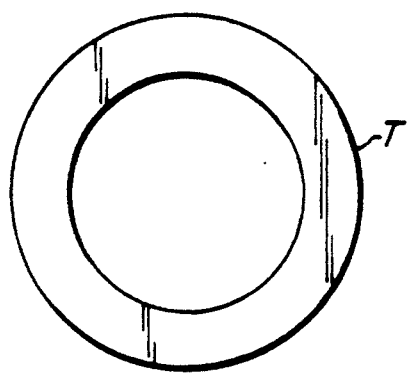
FIG. 1 is a plan section of a subchannel tube before rifling.
Figure 2A:
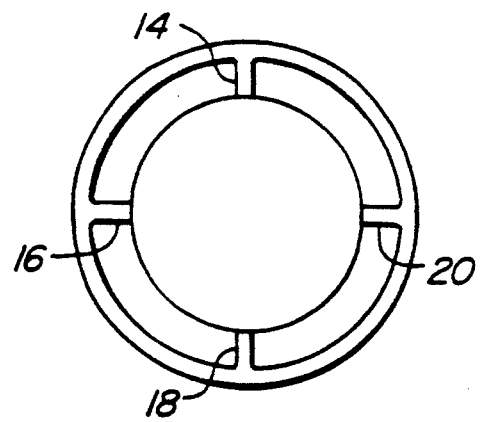
FIGS. 2A and 2B are plan and side elevation sections of a subchannel tube after rifling with an exemplary 90° twist being illustrated in the disclosed rifling.
Figure 2B:
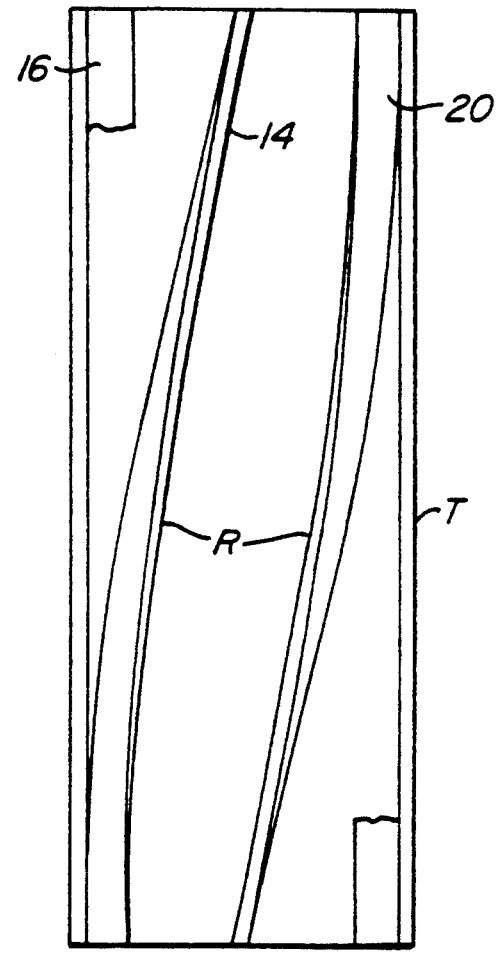

Referring to FIG. 1, a subchannel tube T is shown in its initial dimension in top plan. In FIGS. 2A and 2B, subchannel tube T is shown with rifling R. Rifling here consists of a pitch providing 90° of rotation with four internal threads 14, 16, 18, and 20. The reader will realize that other pitches and numbers of threads can be used.

Figure 3B:
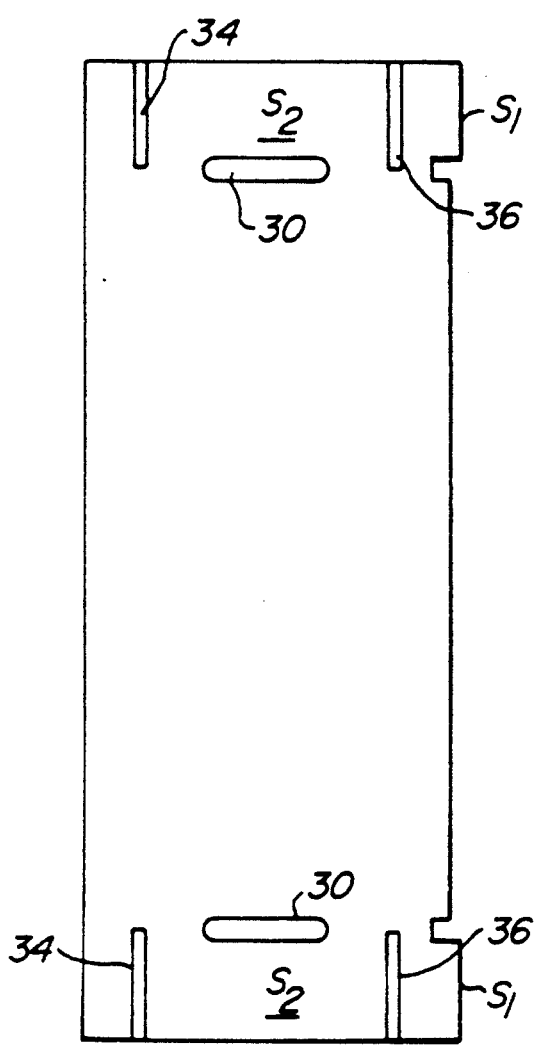
FIGS. 3A and 3B are top plan and side elevations of the rifled subchannel tube of FIGS. 2A and 2B after slots have been cut and stops have been formed in the tube.
Figure 3A:
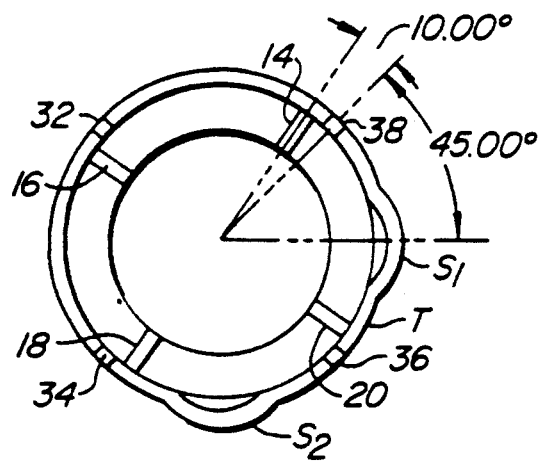

Referring to FIGS. 3A and 3B, the subchannel tube of FIGS. 2A and 2B is configured with stops S1 and S2. These stops S1 and S2 are members against which tubes may be biased to provide spacer alignment of each of the fuel rods F passing through the spacer S. Additionally top and bottom grid notches 32, 34, 36, and 38 are made in anticipation of the receipt of grid members.

Figure 4:
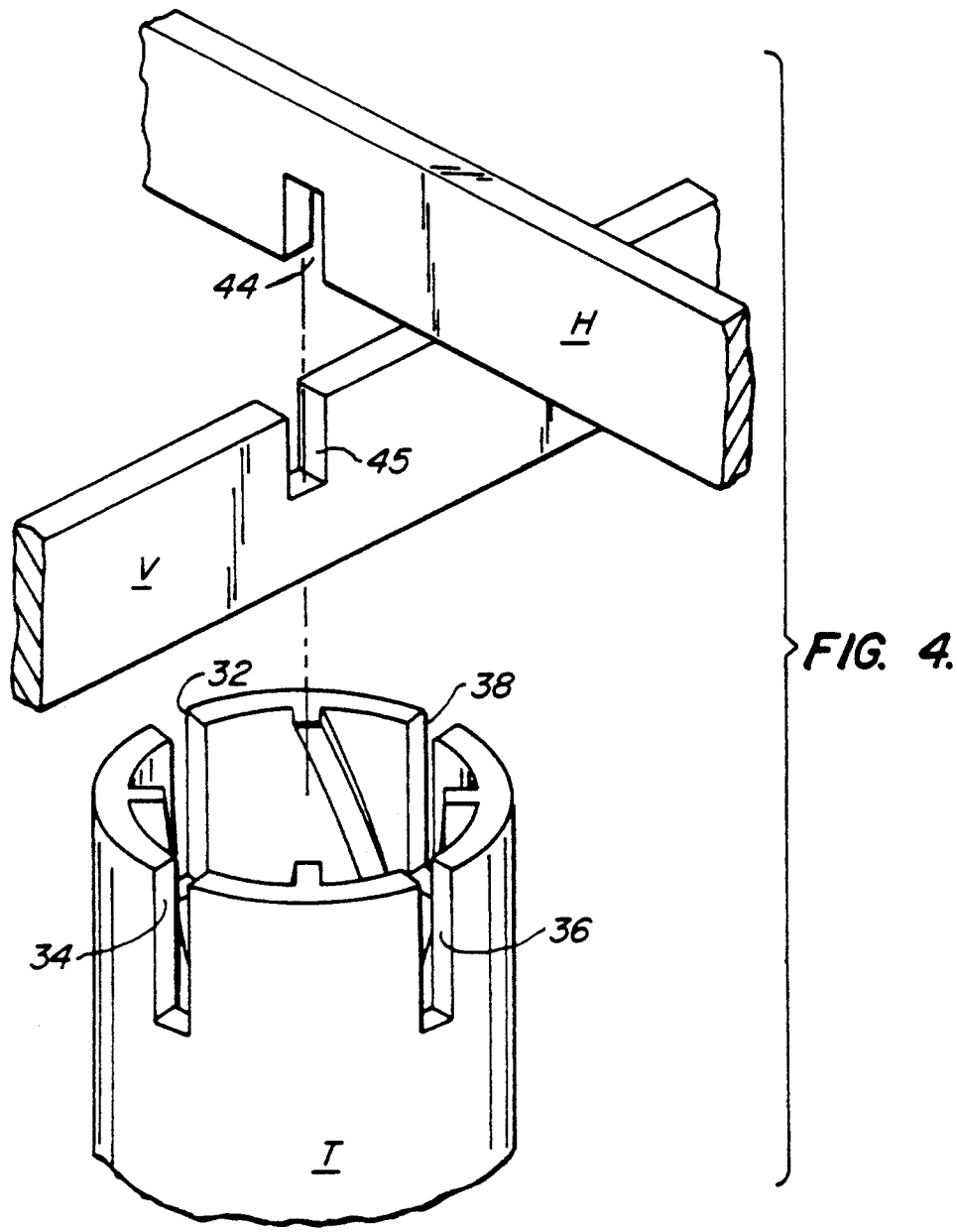
FIG. 4 is a detail of the top of the subchannel tube showing connection to the grid.

Referring to FIG. 4, the top of subchannel tube T is illustrated only, it being understood that the serial steps previously outlined have occurred. Members H and V with respective confronting notches 44, 45 are made to form a grid with the formed grid G being placed into the top interior of each tube T at respective notches 32-38. Fastening—as by spot welding or braising—then occurs. A first grid is formed at the top of the spacer; a second grid is similarly formed at the bottom of the spacer.

Figure 5A:
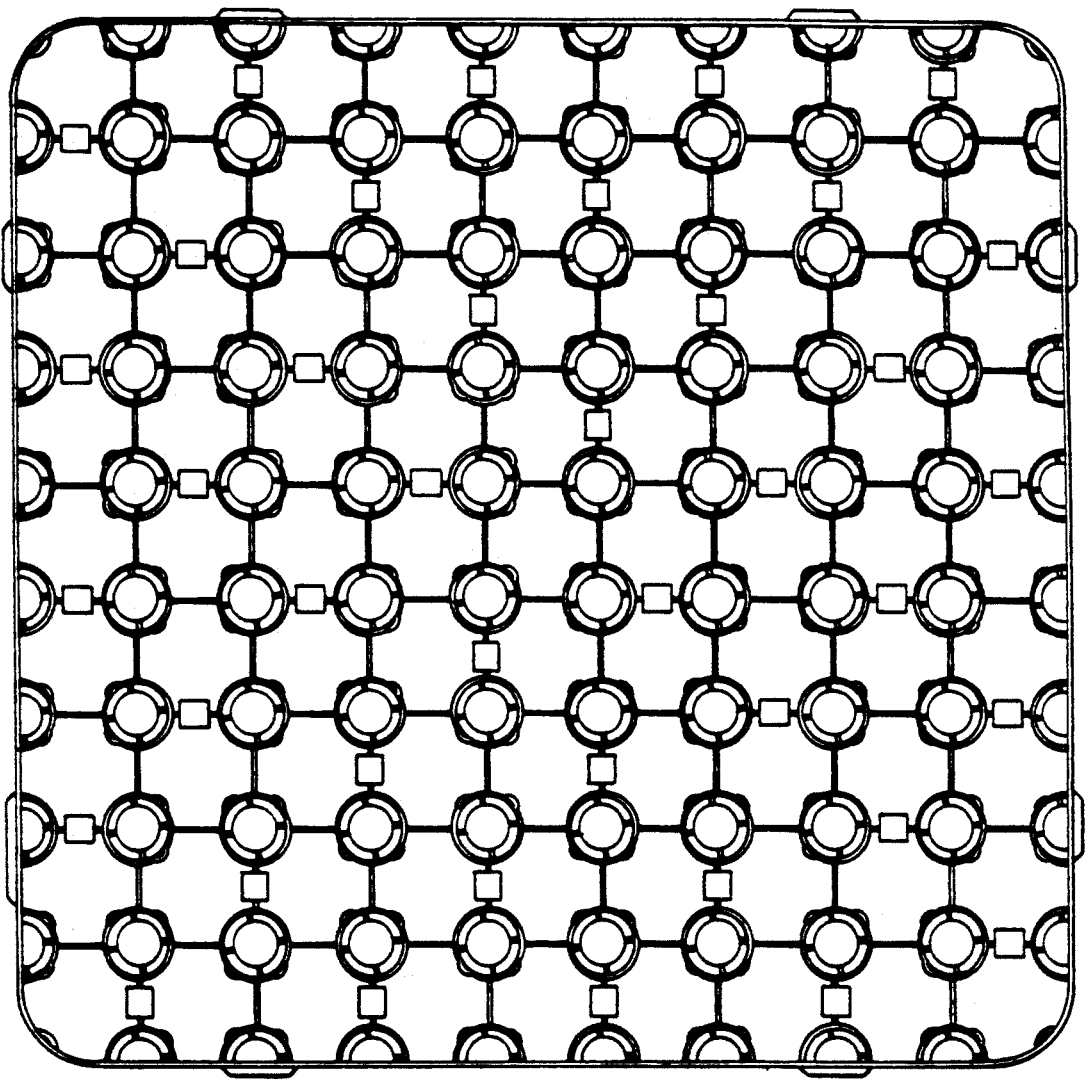
FIG. 5A is a plan view of the completed spacer.
Figure 5B:
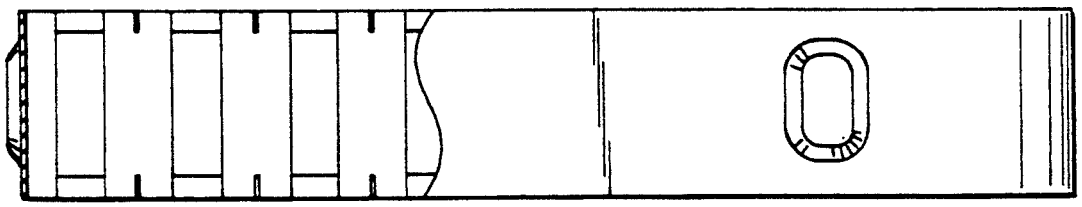
FIG. 5B is a side elevation of the completed spacer with the sectional view of the spacer illustrating the completed exterior construction of the subchannel tubes.

Referring to FIGS. 5A and 5B, the remainder of the process can be understood. Intersecting grid sections of members H and V are drilled out of the respective subchannel tubes T at top and bottom. In the embodiment here illustrated, a drill is used that has the size of the inside diameter of subchannel tubes T and only drills out the top or the bottom. This separate drilling of the top and separate drilling of the bottom has the result that members H and V are ground off flush with tube T. Alternately, drilling can occur with drills that have an outside diameter the same dimension as the inside diameter of the threads formed interior of the subchannel tubes T. In this case, a short protruding stub will be left from members H and V of the grid on the interior of the tube T.

Referring to the section illustrated in side elevation at FIG. 5B, the side elevation of both the interior of the spacer as well as the exterior as surrounded by a band B can be understood. (Deflection tabs are not shown).

Figure 6:
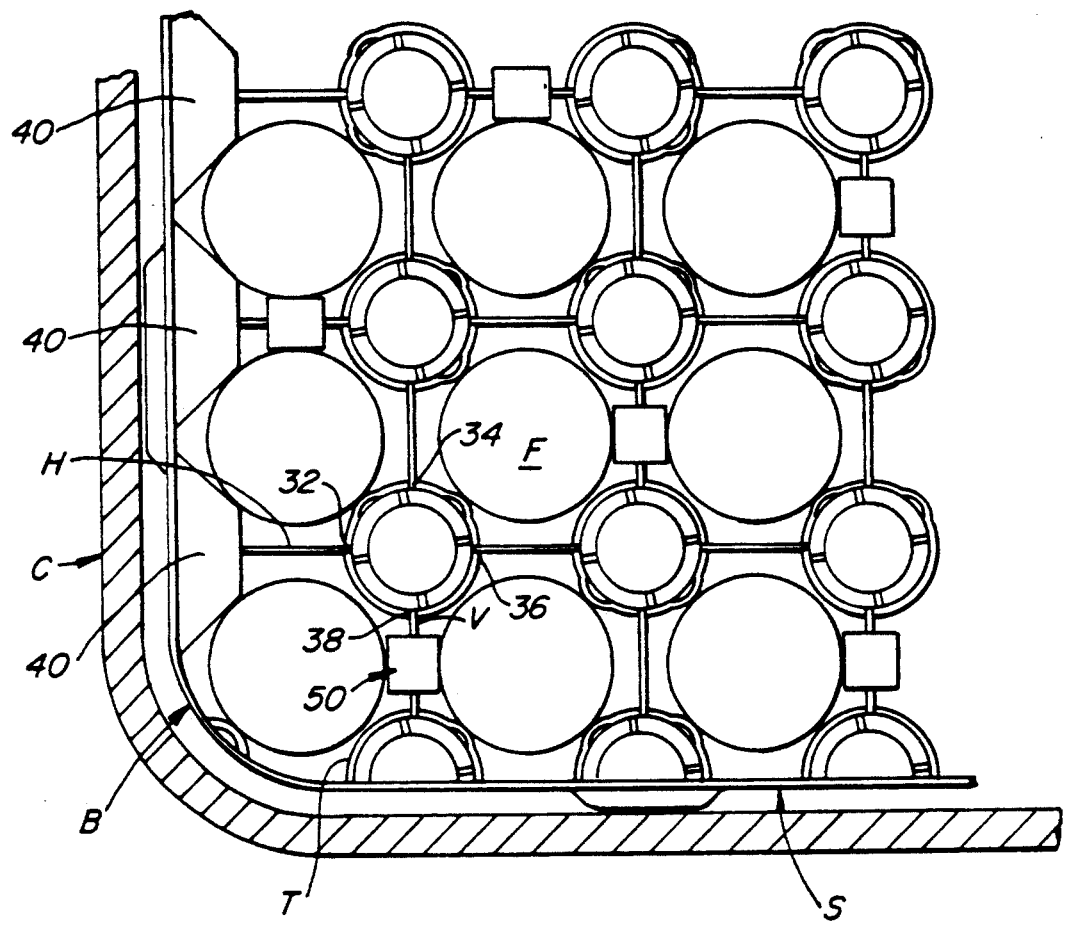
FIG. 6 is a top plan section of a fuel bundle at a spacer illustrating the fuel rods placed within the spacer and schematically illustrating the steam separating function of the subchannel tubes.

The finished construction can be seen in FIG. 6 holding fuel rods F in place. Spacer S is shown at a corner section only having members H and V connected at the exterior of tubes T at the respective grooves 32-38. Loop springs 50 have been placed at selected members H and V; the placement and configurations of such springs with respect to stops S1 and S2 are well known and will not be further discussed herein. Further, it will be noted that at the periphery of the formed grid, some tubes T have been cut in half at the adjacent point to band B.

Figure 7:
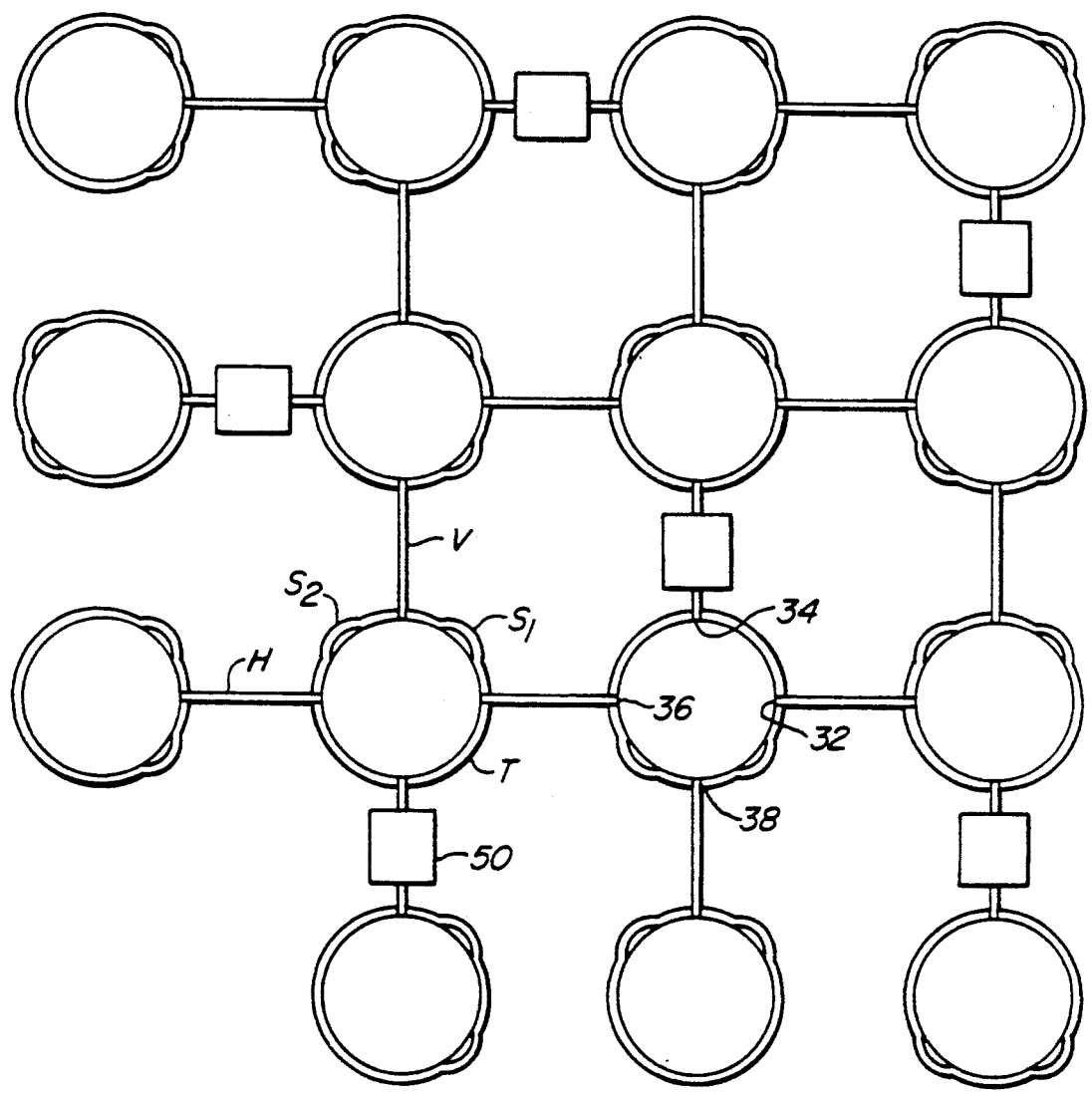
FIG. 7 is a portion of a prior art cross point spacer grid having subchannel tubes.

FIGS. 7, 8, and 9 illustrate an alternate construction in which twisted strips of metal are inserted interior of subchannel tubes T. This construction is not preferred because such twisted strips of metal must independently attach to subchannel tubes T at both ends rather than be formed as an integral portion of tubes T. When an integral construction is utilized, the chances of small portions of an assembly separating as loose pieces interior of a reactor vessel is minimized.

Referring to FIG. 7, a grid has been formed of members H and member G and joined to subchannel tubes T at grooves 32, 34, 36, and 38. As before, springs 50 have been added at selected intervals to bias fuel rods F (not shown) into stops S1 and S2.

Figure 8A:
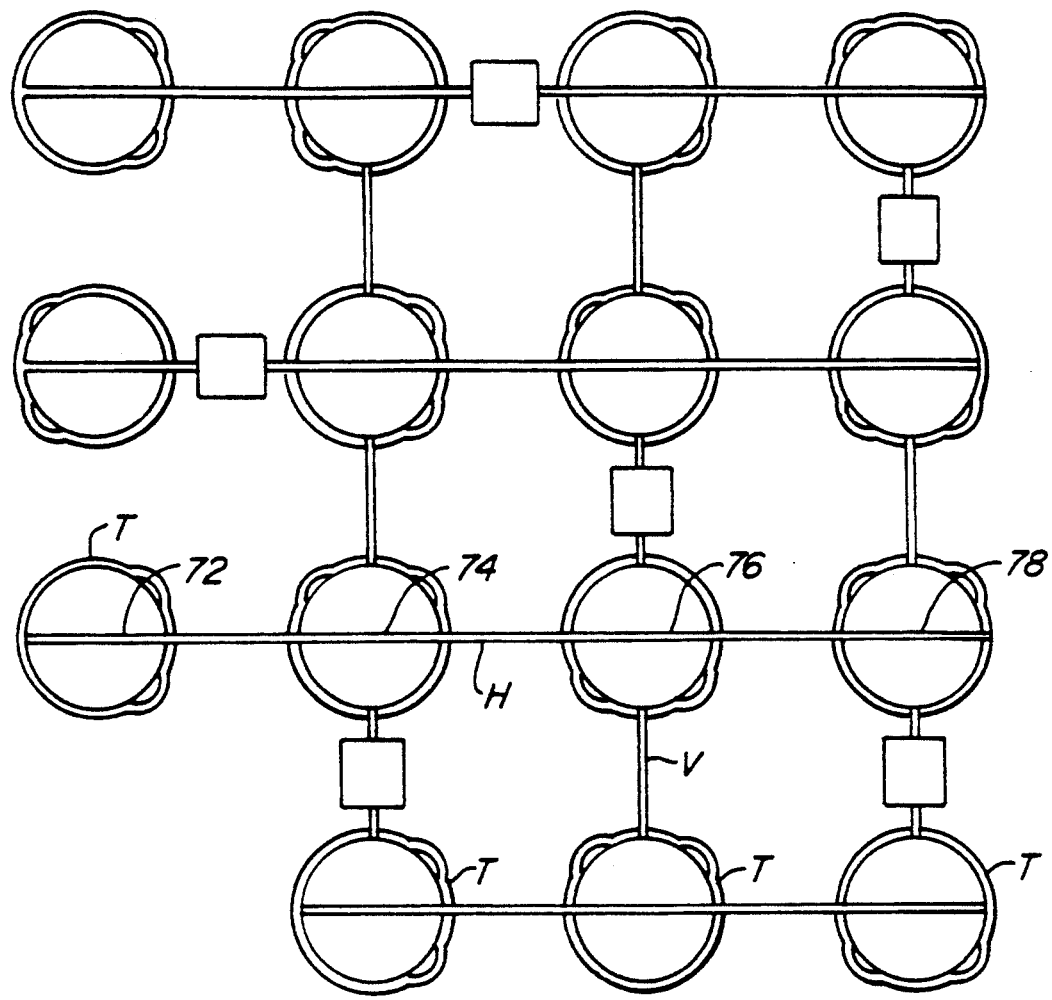
FIGS. 8A and 8B are respective plan and elevation views illustrating the cross point spacer grid of FIG. 7 with swirl vanes inserted.
Figure 8B:
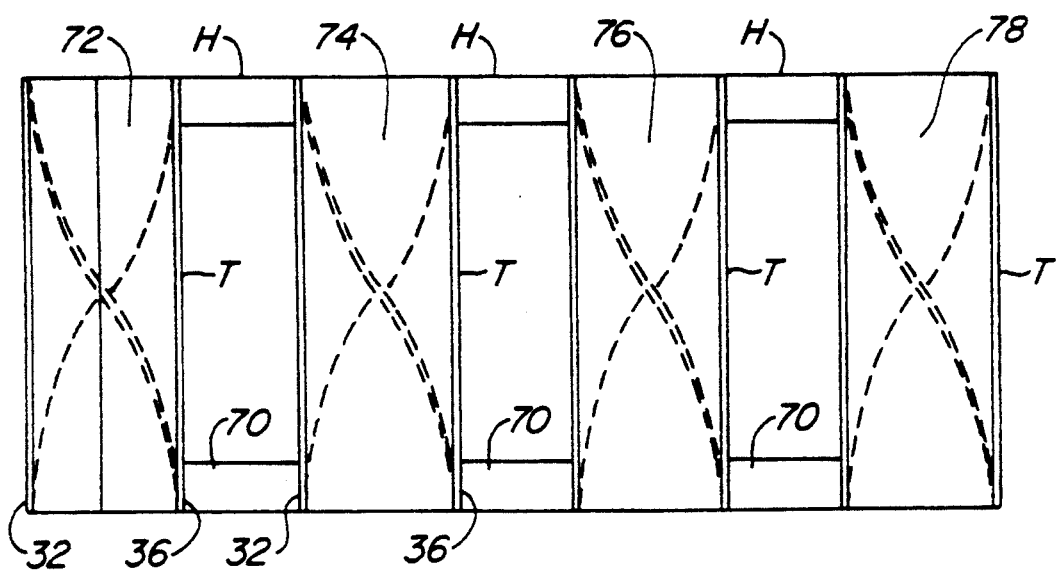

Referring to FIG. 8B, a group of metal strips 72, 74, 76, and 78 joined at the bottom grid by continuous grid member 70 have each been inserted interior of subchannel tube T. Thereafter, these members have been twisted. The particular twist here illustrated is 180°, it being realized that other twist angles could be used as well.

Referring to FIG. 8A, top members H and top and bottom members V are placed and fastened. A grid structure having central swirling metal pieces 72–78 is formed where each of the metal pieces is fastened top and bottom to the respective subchannel tube T.

Figure 9A:
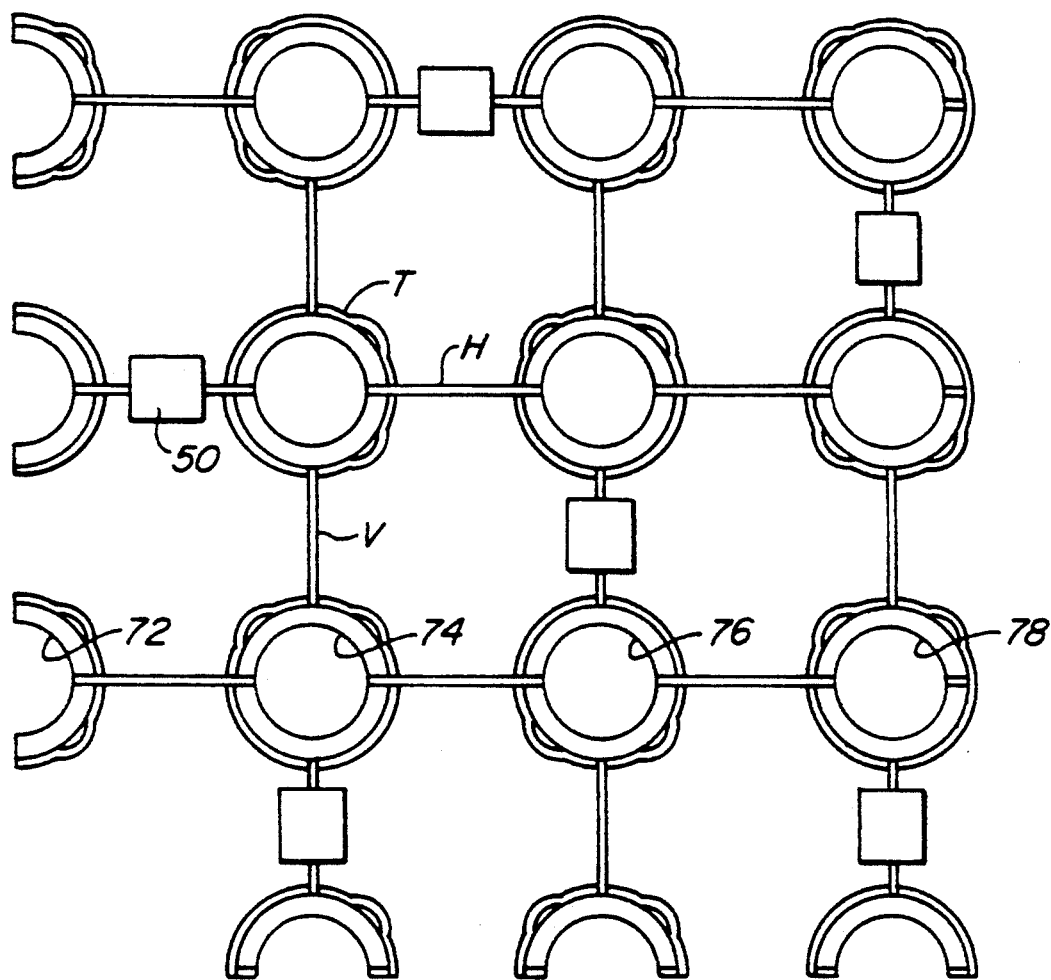
FIG. 9A and 9B are respective plan and elevation views illustrating the cross point spacer grid of FIGS. 8A and 8B with the central portion of the swirl vanes drilled away; and, FIG. 10 is a truncated section of a fuel bundle incorporating the spacer of this invention.
Figure 9B:
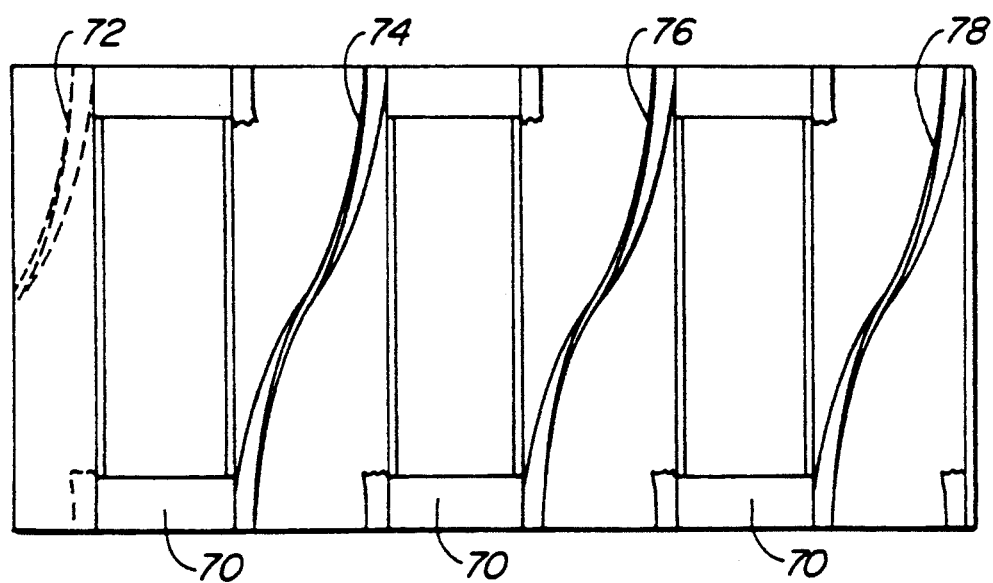

Finally, and referring to FIGS. 9A and 9B, the center of such subchannel tubes T is drilled out. This leaves the respective constructions of FIGS. 9A and 9B. The reader will understand that the attachment of this spacer configuration to spacer band B and insertion of fuel rods F is well known and will not be further set forth herein.

What is claimed is:

1. In a cross point spacer including a spacer grid for defining surrounding cells in a fuel rod matrix interior of a fuel bundle at selected elevations within said fuel bundle comprising:

pluralities of normally aligned members for extension between respective rows and columns fuel rods for forming a first part of bounding cells around the fuel rod matrix of a fuel bundle;

vertically aligned subchannel tube connected to said members to form a second part of bounding cells around the fuel rod matrix of a fuel bundle and to form a mechanical interconnection to said grid members and to define subchannel flow volumes at the subchannel between adjacent fuel rods;

the improvement to said subchannel tubes comprising:

peripheral attachments interior of said tubes for providing a spiral flow to at least some of the steam water mixture flowing through said tube whereby at least some water is centrifugally classified from said steam flow through said subchannel tubes upon discharge of said coolant flow from said subchannel tubes; and said peripheral attachments interior of said tubes defining a central flow free volume in said subchannel tubes for providing the upward unobstructed flow of coolant within said tubes.

2. The invention of claim 1 wherein said internal projections are integral with the tubes and have the form of an internal thread with a very long pitch.

3. The invention of claim 1 and wherein said peripheral attachments interior of said tubes comprise threads.

4. The invention of claim 2 and wherein said internal projections of said tubes comprise spiral metal strips attached to the inside periphery of said tubes.

5. In a cross point spacer including a spacer grid for defining surrounding cells in a fuel rod matrix interior of a fuel bundle at selected elevations within said fuel bundle comprising:

pluralities of normally aligned members for extension between respective rows and columns fuel rods for forming a first part of bounding cells around the fuel rod matrix of a fuel bundle;

vertically aligned subchannel tubes connected to said and members to form a second part of bounding cells around the fuel rod matrix of a fuel bundle and to form a mechanical interconnection to said grid members and to define subchannel flow volumes at the subchannel between adjacent fuel rods;

peripheral attachments interior of each of said subchannel tubes for providing a spiral flow to at least some of the steam water mixture flowing through each of said subchannel tubes whereby at least some water is centrifugally classified from said steam flow through said subchannel tubes upon discharge of said coolant flow from said subchannel tubes; and said peripheral attachments interior of said subchannel tubes defining a central flow free volume in said subchannel tubes for providing the upward unobstructed flow of coolant within said tubes.

6. The invention of claim 5 and wherein said spacer includes upper and lower grids.

7. The invention of claim 5 and wherein said peripheral attachments interior of said tubes comprise threads.

8. The invention of claim 7 and wherein said peripheral attachments interior of said tubes comprise spiraled metal strips adjacent the inside periphery of said tube.

9. A method of constructing a cross point spacer including a spacer grid for defining surrounding cells in a fuel rod matrix interior of a fuel bundle at selected elevations within said fuel bundle comprising:

providing pluralities of normally aligned members for extension between respective rows and columns fuel rods for forming a first part of bounding cells around the fuel rod matrix of a fuel bundle;

providing vertically aligned subchannel tube connected to said members to form a second part of bounding cells around the fuel rod matrix of a fuel bundle and to form a mechanical interconnection to said grid members and to define subchannel flow volumes at the subchannel between adjacent fuel rods;

placing peripheral attachments interior of said subchannel tubes for providing a spiral flow to at least some of the steam water mixture flowing through said subchannel tubes whereby at least some water is centrifugally classified from said steam flow through said subchannel tubes upon discharge of said coolant flow from said subchannel tubes; and defining in said peripheral attachments interior of said tubes central flow free volumes in said subchannel tubes for providing the upward unobstructed flow of coolant within said tubes.

10. The process of claim 9 and where said placing peripheral attachments interior of said tubes for providing a spiral flow to a steam water mixture flowing through said tube for enabling water to be centrifugally classified includes placing threads interior of said tubes.

* * * * *